United States Patent [19]

Hostetler

[11] Patent Number: 5,119,766
[45] Date of Patent: * Jun. 9, 1992

[54] SAFETY LOCK

[76] Inventor: Eldon Hostetler, 15110 Country Rd. 20, Middlebury, Ind. 46540

[*] Notice: The portion of the term of this patent subsequent to Dec. 5, 2006 has been disclaimed.

[21] Appl. No.: 660,694

[22] Filed: Feb. 25, 1991

Related U.S. Application Data

[63] Continuation of Ser. No. 149,386, Jan. 28, 1988, Pat. No. 5,016,574.

[51] Int. Cl.$^5$ .................................................. A01K 7/00
[52] U.S. Cl. ................................................... 119/72.5
[58] Field of Search .......................... 119/18, 72, 72.5; 24/457, 456, 573, 574, 546; 248/4, 39, 81, 82, 84

[56] References Cited

U.S. PATENT DOCUMENTS

| | | |
|---|---|---|
| 306,874 | 10/1884 | Thatcher . |
| 721,577 | 2/1903 | Lindner . |
| 1,377,552 | 5/1921 | Bloom . |
| 1,480,746 | 1/1924 | DeBie . |
| 1,493,089 | 5/1924 | Walker . |
| 1,718,821 | 6/1929 | Herschede . |
| 1,911,447 | 5/1933 | Heuer . |
| 2,025,848 | 12/1935 | Collis . |
| 2,026,454 | 12/1935 | Benzing . |
| 2,355,196 | 8/1944 | Zahodiakin . |
| 2,537,750 | 1/1951 | Gretschel . |
| 3,172,178 | 3/1965 | Copell . |
| 3,236,142 | 2/1966 | Bradway . |
| 3,596,936 | 8/1971 | Dieckmann . |
| 3,674,287 | 7/1972 | Selley . |
| 3,695,645 | 10/1972 | Mommsen . |
| 3,695,646 | 10/1972 | Mommsen . |
| 3,753,582 | 8/1973 | Graham . |
| 3,845,524 | 11/1974 | Hull et al. . |
| 4,099,444 | 7/1978 | Millheiser et al. . |
| 4,193,133 | 3/1980 | Laibach et al. . |
| 4,244,608 | 1/1981 | Stuemky . |
| 4,271,888 | 6/1981 | Robinson . |
| 4,284,036 | 8/1981 | Hostetler ............................ 119/72.5 |
| 4,984,537 | 1/1991 | Steudler, Jr. ........................ 119/72.5 |
| 5,016,574 | 5/1991 | Hostetler ............................ 119/72.5 |

Primary Examiner—Gene Mancene
Assistant Examiner—Thomas Price
Attorney, Agent, or Firm—Barnes & Thornburg

[57] ABSTRACT

A separate U-shaped safety lock is provided for use with a trigger drinker utilizing a bayonet type coupler. In poultry and small animal trigger drinker watering systems the U-shaped safety lock restricts telescopically interfitting components from rotation. The lock is inserted through one component and partially surrounds a boss on a second component to prevent both clockwise and counterclockwise rotation of the components relative to one another. The safety lock can break upon reaching a pre-determined torque.

18 Claims, 1 Drawing Sheet

U.S. Patent    June 9, 1992    5,119,766
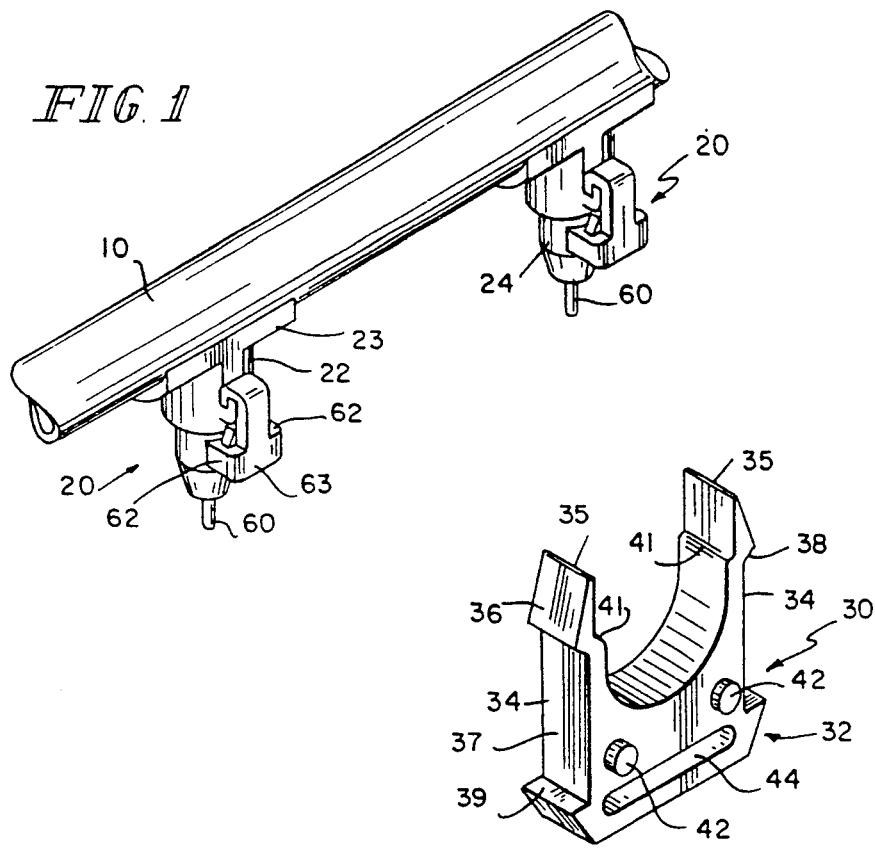
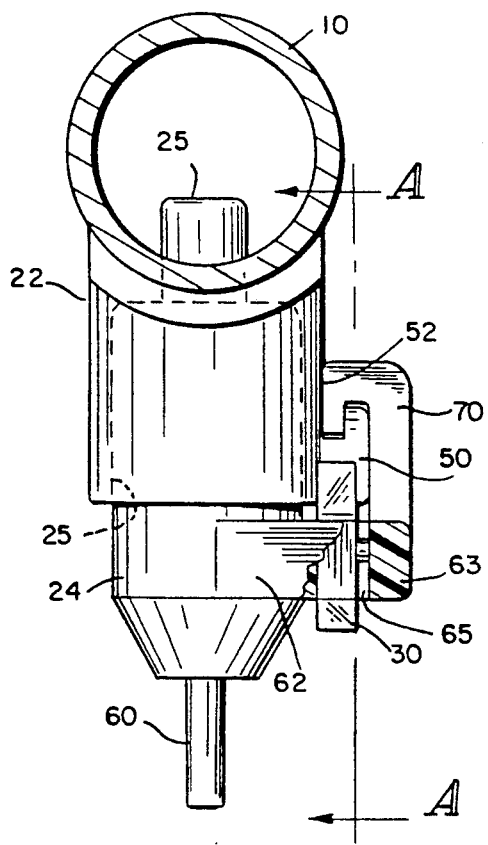
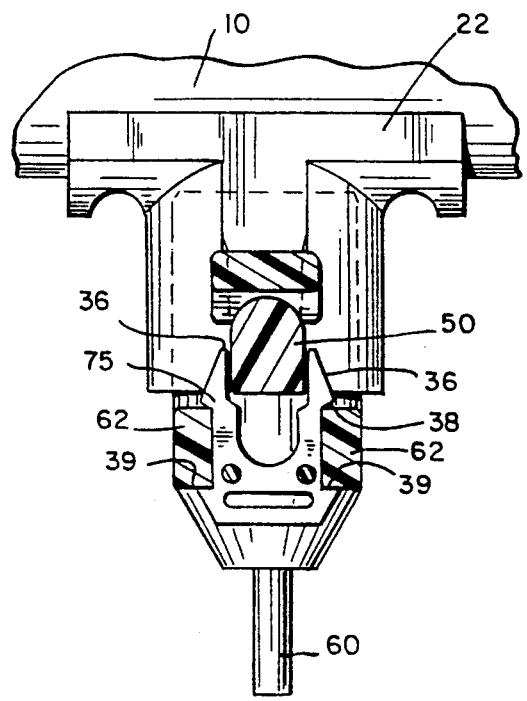

SAFETY LOCK

This application is a continuation, of application Ser. No. 07/149,386, filed Jan. 28, 1988 now U.S. Pat. No. 5,016,574.

BACKGROUND AND SUMMARY OF THE INVENTION

The present invention relates generally to watering systems for poultry and/or small animals and, more particularly, to watering systems employing trigger drinkers.

Various types of watering devices for fowl and small animals have been developed previously. One particular watering device for fowl and small animals is a two-part trigger drinker. One element telescopically interfits into the other element. Interlocking hooks on the housings prevent relative rotation of the housings when properly telescopically interfit together. The interlocking hooks releasably resist relative rotation of the housings when the interlocking hooks are operatively engaged. U.S. Pat. Nos. 4,589,373 and 4,637,365, assigned to the same assignee as the present invention, both utilize telescopically inter-fitting parts connected by a bayonet-type lock. The disclosures of these patents are specifically incorporated herein.

These telescopically inter-fitting components, utilizing a bayonet-type lock, provide distinctive advantages over the earlier trigger drinker units. However, the bayonet-type lock may become worn from changing and cleaning. Worn interlocking hooks may require less rotational force for removal of the frictional engagement. This can cause problems when an adult bird pecks on the drinker component out of curiosity or mischievous design. These birds can also inadvertently bump against the interlocking hooks causing the telescopically interfitting components to disengage.

It is therefore an object of the present invention to provide an improved watering device for poultry and small animals.

It is a further object to provide an improved safety lock for securing the telescopically interfitting components.

It is a further object to provide anti-rotational lock in conjunction with the bayonet-type lock.

It is a further object to provide a simple independent anti-rotational lock adaptable to trigger drinkers presently used in the poultry industry.

It is a further object to provide a lock which can prevent rotation in either a clockwise or counter-clockwise direction.

It is a further object to provide a lock which is easily insertable within a trigger drinker.

It is a further object to provide a weakened portion on the lock so that the safety clip will break at a predetermined torque.

It is a further object to provide the weakened portion on the arm of the clip at a pre-selected location whereby removal of the broken clip is easily facilitated.

It is a further object to provide the safety clip with a small opening for insertion of a small tool to facilitate removal of the safety clip from the coupling unit.

These and other objects of the present invention are obtained in the provision of an independent safety lock which is insertable into the mating hooks of a trigger drinker. The lock provides additional protection from incidental contact by poultry and other animals. The safety lock provides a rotation limiting device which has retention means incorporated therein so that the lock is easily inserted and difficult to remove from an opening in the interlocking hooks. A preferred embodiment of the safety lock incorporates weakened portions on the arm section to allow breakage at a predetermined torque.

Other objects, advantages, and novel features of the present invention will be readily apparent upon consideration of the following detailed description in conjunction of the drawings.

BRIEF DESCRIPTION OF THE DRAWINGS

FIG. 1 is a pictorial view of two drinker units attached to a water supply line.

FIG. 2 is a pictorial view of the U-shaped safety lock which is insertable in a trigger drinker.

FIG. 3 is a side view with a portion broken away of a trigger drinker unit with a bayonet-type lock utilizing the safety clip of FIG. 2.

FIG. 4 is a partial cross-sectional view along AA of FIG. 3.

DESCRIPTION OF THE PREFERRED EMBODIMENTS

FIG. 1 shows a fluid supply line 10 with two trigger drinker units 20 having a first telescopically inter-fitting element 22 attached to supply line 10. Element 22 is ultra sonically welded to supply line 10 at base section 23. Alternatively, a glue joint connection could be used to secure the components together. A second telescopically inter-fitting element 24 is inserted in the internal portion 25 of element 22 thereby forming a valve housing with an inlet valve chamber 26 and an outlet via trigger pin 60. The bayonet-type lock is described in the detailed descriptions of U.S. Pat. Nos. 4,589,373 and 4,637,365 assigned to the same assignee and incorporated previously by reference.

FIG. 2 is a pictorial view of the U-shaped safety lock 30 providing a rotation limiting means for drinker units. Lock 30 is a separate component from the trigger drinker 20. The U-shaped safety lock 30 has a base portion 32 and two arms 34 extending outward from the base portion 32. In a preferred embodiment the arms are tapered at the end distal from base 32 to form line 35. The distal end portion of the arm resembles a wedge shape. The wedge shape includes inclined plane 36 on the outside portion 37 of arms 34. A preferred safety lock 30 has a ledge 38 formed by a wider section of the arm 34 which is the broadest portion of the wedge shape. Ledge 38 is used as a stop or holding portion when in contact with arm 62 of component 24 as seen in FIG. 4. This ledge 38 is also constructed with a slight chamfered edge to facilitate removal of the safety lock from the anti-rotational position.

Base portion 32 also has ledges 39 formed as a result of legs 34 being connected to base portion 32 inwardly from the width of the base. In other words, a lip remains on the base portion which acts as a stop. Ledge or stop 39 engages the bottom of arms 62 of component 24 to prevent clip 30 from further insertion into the opening 65 in component 24.

FIG. 3 illustrates the use of the two piece coupling system utilizing telescopic portions 22 and 24 in conjunction with safety lock 30. As mentioned earlier, U-shaped safety lock 30 is a separate, removable component which restricts rotation of the cylindrical members 22 and 24 of the coupling system when inserted through opening 65 of component 24. The coupling system includes a hook-like boss 50 on an outer surface 52 of the first coupler element 22. The distance between arms 34 of safety lock 30 at the distal end is slightly larger in diameter than boss 50. When lock 30 is inserted through opening 65 the inside portion of arms 34 surround boss 50.

Ledges 41 on the inside portions of arms 34 provide a secondary stop to prevent the safety lock from being inserted beyond the designed location. Ledges 41 also provide a weakened area of arms 34 for breaking at a predetermined torque. Additionally, The ledges 41 allow the arms 34 to bend inward until the inner portion contacts boss 50. At this location the distal end must bend outward to surround boss 50.

The second cylindrical element 24, which includes the trigger drinker nipple 60, has two arms 62 extending radially outward and substantially parallel to each other. These arms 62 are connected by a bight 63 thereby forming a U-shape portion. In the center of the U-shaped portion is a opening 65 which is directly below boss 50 when the coupler is properly positioned. The bight is connected to a resilient J-shaped hook 70 extending longitudinally which cooperates with the boss 50 of the first cylindrical element 22 to provide the initial two-piece coupler. Frictional forces of boss 50 and hook 70 hold the bayonet type lock in position. In other words, the bayonet lock utilizes complimentary hooks on members 22 and 23. The previously incorporated patents provide additional details to this aspect of the lock. The safety lock 30 cooperates with these features of the trigger drinker to restrict rotation and proved a more secure unit.

Specifically, safety lock 30 is inserted through opening 65 formed by the cylindrical drinker, the two parallel arms 62 and the connecting bight 63. Arms 34 are preferably flexible and resilient. When inserted through opening 65 inclined planes 36 force arms 34 to flex inward. Arms 34 then spring back in position. Ledge 38 is slightly chamfered so as to allow removal of safety lock 30 with appropriate force. Boss 50 is partially surrounded on both sides by arms 34 of the safety lock 30. Opening 65 is filled by the outer portions 37 of arms 34 thereby restricting rotational motion of elements 22 and 24. In other words, one arm prevents clockwise rotation while the other arm prevents counterclockwise rotation.

As stated earlier, the safety lock 30 preferably includes a weakened portion 75 which will break at a pre-determined torque. As seen in FIG. 4, the weakened portion 75, including incline plane 36, will fall from the drinker unit allowing the broken safety lock 30 to be easily replaced without substantial harm to the trigger drinker unit.

As seen in FIG. 2, protrusions 42 are used to position the safety clip 30 within the opening 65. Protrusions 42 also are used to limit horizontal motion if the opening 65 is substantially larger than the width of the safety lock 30. Additionally protrusions 42 can be designed for specific sizes of openings 65.

A preferred embodiment of safety lock 30 includes opening 44 in the base. Opening 44 is constructed so that a tool arrangement (not shown) can be inserted within. Opening 44 is small enough so that an adult chicken cannot force its beak into the opening and pull the safety clip from the trigger drinker unit.

The present invention is a rotation limiting device. However, by limiting the rotation in the telescopic coupling system which utilizes the bayonet-type lock, the coupling system is prevented from telescopic movement as well.

Although the present invention has been described in detail, the same is by way of illustration and example only and is not to be taken by way of limitation. The spirit and scope of the present invention are to be limited only by the terms of the appended claims.

What is claimed is:

1. A safety lock, for a watering device for poultry and small animals, including a valve housing adapted to be connected to a fluid supply line and having an inlet, an outlet, and a valve chamber; said valve chamber being formed from first and second telescopically interfitting elements; said first and said second telescopically interfitting elements releasably secured together with interlocking hooks, comprising:

a rotation limiting means separate from said first and said second telescopically interfitting elements for preventing substantial rotation of said first and said second telescopically interfitting elements relative to each other;

said first and said second telescopically interfitting elements have complimentary external hooks thereon which are adapted to be releasably rotationally interlocked when said parts are in selected telescopic positions;

said first telescopically interfitting element having an external boss and said second interfitting element having a hooking means including an opening adjacent said boss; and a clip provides said rotation limiting means and is inserted within said opening and partially surrounds said boss.

2. The safety lock of claim 1 wherein said opening is formed by a first and a second arm extending from said second telescopically interfitting element joined by a bight; said clip including flexible arms for insertion through said opening and surrounding said boss.

3. In an antirotational coupling system with a bayonet-type locking engagement comprising:

a first component having a boss on the outer surface;

a second component having two arms extending outward, a bight connecting said arms thereby forming a U-shaped section with said arms, an opening being formed between said U-shaped section and said second component, and a J-shaped hook extending from said bight longitudinally and cooperating with said boss on said first component to provide an initial coupling system;

the improvement comprising:

a U-shaped safety lock with a base section and two flexible arms having inner and outer sides for insertion in said opening in said U-shaped section of said second component;

said flexible arms of said safety lock being constructed to be inserted through said opening and to partially surround said boss; and said inner sides of said flexible arms partially surrounding said boss, said outer sides and said base section cooperating with said opening to limit rotational motion of said first and second components when those components employ said initial coupling system.

4. The safety lock of claim 3 wherein said arms include a preselected weakened portion to allow for breakage at a predetermined torque.

5. The safety lock of claim 3 wherein an opening in a base portion of the U-shaped safety lock allows a tool to be inserted to remove the U-shaped lock.

6. The safety lock of claim 3 wherein said arms of the safety lock have inclined planes on the outer sides for insertion through said opening of said arm beginning at a bottom portion of said arms, said outer sides including stops cooperating with said U-shaped section of said second component to hold safety lock in position.

7. The safety lock of claim 6 wherein said stops are slightly chamfered for removal of said safety lock.

8. The safety lock of claim 3 wherein at least one protrusion extends outward from said base portion of said safety lock to restrict horizontal movement of said safety lock.

9. The safety lock of claim 3 wherein said lock is formed of plastic.

10. A U-shaped clip providing antirotational means constructed for use with bayonet-type lock systems with an opening in one coupler and a boss on the second coupler comprising:
   said clip having a base portion and two flexible arms;
   said arms having outside edges and inside edges;
   said inside edges constructed to partially surround said boss;
   said outside edges having first inclined surfaces beginning at distant ends for flexible insertion within said openings; and
   said outside edges further having second inclined surfaces which also act as stops to hold said clip in position and allow withdrawal upon a predetermined withdrawal force.

11. A safety lock for a watering device for poultry and small animals including a valve housing adapted to be connected to a fluid supply line and having an inlet, an outlet and a valve chamber; said valve chamber being formed from first and second telescopically interfitting elements said first and said second telescopically interfitting elements releasably secured together with interlocking hooks, comprising:
   a rotation limiting means for preventing substantial rotation of said first and said second telescopically interfitting elements relative to each other, said rotation limiting means inserted vertically to prevent horizontal rotation;
   said first and said second telescopically interfitting elements having complimentary external hooks thereon which are adapted to be rotationally interlocked when said parts are in selected telescopic positions; said first telescopically interfitting element having an external boss and said second telescopically interfitting element having a hooking means including an opening adjacent said boss; and
   a clip provides said rotation limiting means and is inserted within said opening and partially surrounds said boss.

12. The safety lock of claim 11 wherein said opening is formed by a first and a second arm extending from said second telescopically interfitting element joined by a bight; said clip including flexible arms for insertion through said opening and surrounding said boss.

13. A safety lock for a watering device for poultry and small animals, said watering device including first and second telescopically interfitting elements, said first and said second telescopically interfitting elements being releasably secured together with interlocking, complimentary external hooks, said hooks being adapted to be releasably rotationally interlocked when said first and second telescopically interfitting elements are in selected telescopic positions, comprising:
   a rotation limiting means separate from said first and said second telescopically interfitting elements for preventing substantial rotation of said first and said second telescopically interfitting elements relative to each other when those elements are interlocked; and
   said rotation limiting means including a clip which partially engages at least one of said interlocking hooks.

14. The safety lock of claim 13 wherein said clip includes oppositely disposed arms which partially surround at least one of said interlocking hooks.

15. A safety lock for a watering device for poultry and small animals, said watering device including first and second telescopically interfitting elements, said first and said second telescopically interfitting elements being releasably secured together by complimentary external hooks thereon which are adapted to be rotationally interlocked when said first and second telescopically interfitting elements are telescopically interfit, comprising:
   a rotation limiting means for preventing substantial rotation of said first and said second telescopically interfitting elements relative to each other;
   said rotation limiting means being inserted substantially vertically to limit horizontal rotation; and
   said rotation limiting means including a clip which partially engages at least one of said external hooks.

16. A safety lock for a watering device for poultry and small animals, said watering device including first and second telescopically interfitting elements; said first and said second telescopically interfitting elements being releasably secured together with interlocking hooks, comprising:
   a rotation limiting means separate from said first and said second telescopically interfitting elements for preventing substantial rotation of said first and second telescopically interfitting elements relative to each other; and
   said rotation limiting means including a clip having oppositely disposed legs which partially engage at least one of said interlocking hooks.

17. In a poultry watering system having a fluid supply line and at least one drinker element attached to said fluid supply line by a telescopically interfitting connection, said connection being maintained by rotational interlocking of mating hook elements, means removably connected to said mating hook elements, for preventing unlocking rotation of said mating hook elements, comprising a generally U-shaped clip element which is releasably engagable with one of said mating hook elements to block the path of the other of said mating hook elements during unlocking rotation of said mating hook elements relative to each other.

18. A locking device, for use in a poultry watering system having a fluid supply line, at least one drinker element, and first and second mating hook elements which are rotatable with respect to each other between interlocking and unlocking positions in order to releasably connect said drinker element to said fluid supply line, said locking device comprising:
   a generally U-shaped clip element;
   said clip element being flexibly engagable with said first mating hook element; and
   said clip element being positionable to prevent said second mating hook element from rotating toward said unlocking position when said clip element is engaged with said first mating hook element.

* * * * *

UNITED STATES PATENT AND TRADEMARK OFFICE
CERTIFICATE OF CORRECTION

PATENT NO. : 5,119,766
DATED : June 9, 1992
INVENTOR(S) : Eldon Hostetler

It is certified that error appears in the above-identified patent and that said Letters Patent is hereby corrected as shown below:

In Claim 3, at column 4, line 41, please delete "In" therefor., and "an" should read --An--.

In Claim 10, at column 5, line 24, please delete "partially" therefor,

Signed and Sealed this

Seventh Day of December, 1993

Attest:

BRUCE LEHMAN

Attesting Officer   Commissioner of Patents and Trademarks